United States Patent [19]

Shum

[11] Patent Number: 5,691,627

[45] Date of Patent: Nov. 25, 1997

[54] PUSH-PULL FULL SHUNT SWITCHING BUS VOLTAGE LIMITER WITH CURRENT SENSE CAPABILITY

[75] Inventor: Kin E. Shum, Los Angeles, Calif.

[73] Assignee: Hughes Electronics, Los Angeles, Calif.

[21] Appl. No.: 715,211

[22] Filed: Sep. 17, 1996

[51] Int. Cl.$^6$ ............................................. G05F 1/10
[52] U.S. Cl. ........................... 323/222; 323/282; 323/906
[58] Field of Search ................................ 323/207, 222, 323/234, 282, 284, 299, 351, 906; 363/15, 74, 78, 95

[56] References Cited

U.S. PATENT DOCUMENTS

| | | | |
|---|---|---|---|
| 4,357,524 | 11/1982 | Apfelbeck et al. | 219/501 |
| 4,691,159 | 9/1987 | Ahrens et al. | 323/222 |
| 4,713,742 | 12/1987 | Parsley | 363/124 |
| 4,899,269 | 2/1990 | Rouzies | 363/41 |
| 5,383,109 | 1/1995 | Maksimovic et al. | 323/222 |
| 5,394,075 | 2/1995 | Ahrens et al. | 320/39 |
| 5,489,837 | 2/1996 | Arakawa | 323/207 |
| 5,504,418 | 4/1996 | Ashley | 323/282 |
| 5,583,412 | 12/1996 | Nielsen | 318/811 |

OTHER PUBLICATIONS

Raymond B. Ridley, "A New, Continuous-Time Model For Current-Mode Control", *IEEE Transactions on Power Electronics*, vol. 6, No. 2, Apr. 1991, pp. 271-280.

"Unitrode Integrated Circuits", *Product and Applications Handbook*, 1995, pp. B173-B179.

*Primary Examiner*—Adolf Berhane
*Attorney, Agent, or Firm*—Terje Gudmestad; Elizabeth E. Leitereg; Wanda K. Denson-Low

[57] ABSTRACT

A full shunting BVL with current sense capability includes a pair of parallel connected switches that switch with the same duty cycle D/2 but 180 degrees out of phase to provide current from a power source through a coupled power inductor to a bus. A current transformer is provided with first and second windings connected in series with the pair of switches, respectively, and a third winding. The alternating conduction of current through the first and second windings produces a bidirectional voltage across the third sensor winding that automatically resets the current transformer's ferrite core during each cycle. As a result, the bidirectional voltage can be rectified to produce a current sense signal. The current sense signal is used to provide current-mode control to regulate the bus voltage and supply the demanded load current. The current sense signal can also be used to provide current limiting and current sharing, which allows multiple BVLs to be connected to the same solar array. This smooths the transitions in the load current supplied to the bus.

22 Claims, 3 Drawing Sheets

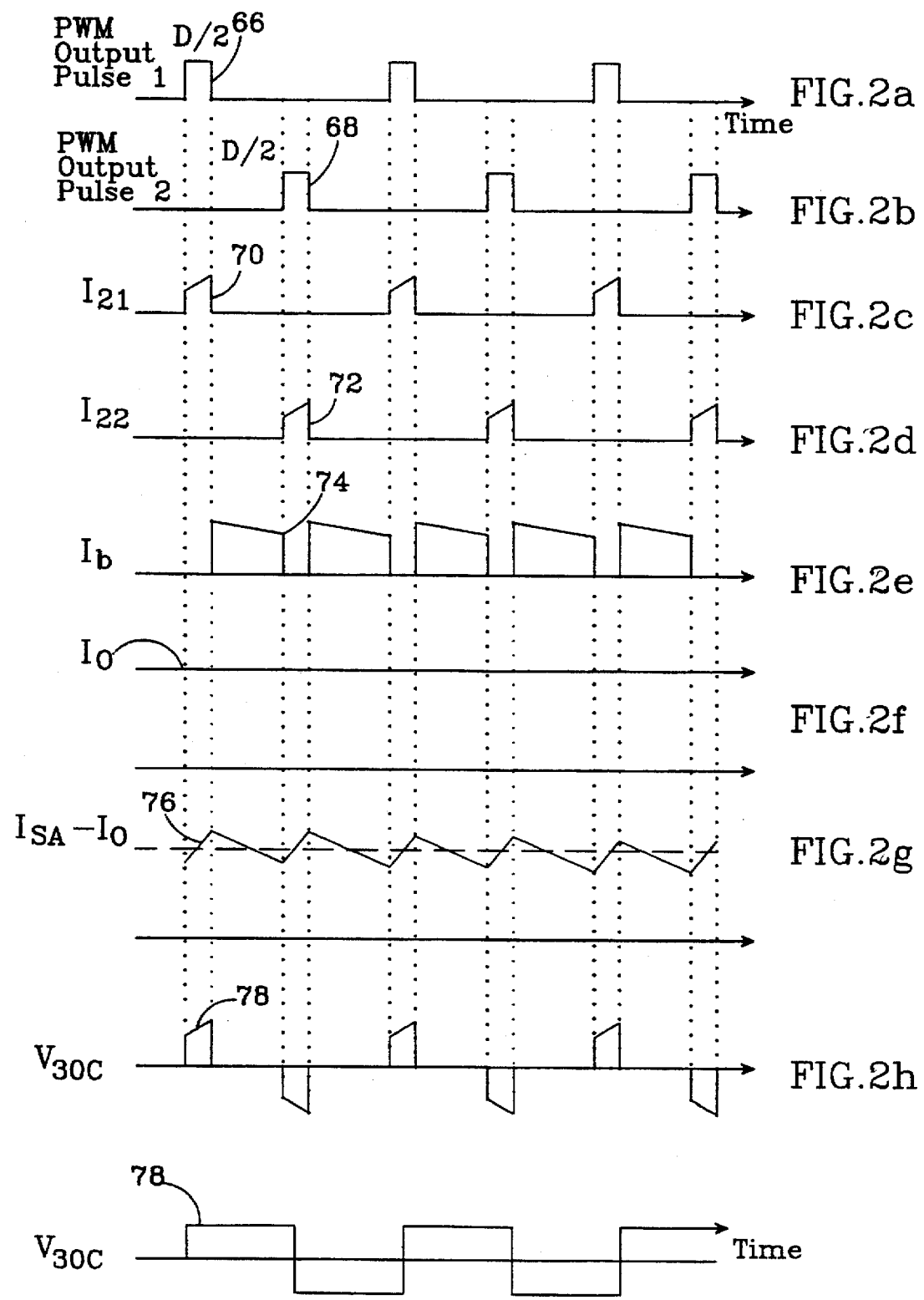

PUSH-PULL FULL SHUNT SWITCHING BUS VOLTAGE LIMITER WITH CURRENT SENSE CAPABILITY

BACKGROUND OF THE INVENTION

1. Field of the Invention

This invention relates to bus voltage limiting (BVL) circuits and more specifically to a full shunt BVL with current sense capability for controlling the application of power from a source to a payload.

2. Description of the Related Art

Photovoltaic solar panel arrays are used as power sources on board spacecraft. The solar arrays provide a substantially constant current at a variable voltage. A power distribution bus is held at a regulated bus voltage and supplies a variable load current to the spacecraft payload such as computers, transponders, lights, etc. A BVL connects the solar array and the bus to maintain the regulated bus voltage and controls the load current in response to changes in payload demand. The solar array voltage changes as the load current changes to maintain output power to the payload substantially equal to the input power of the solar array.

A detailed description of known BVLs for spacecraft solar arrays is disclosed in Ahrens et al. U.S. Pat. No. 4,691,159, assigned to the assignee of the present invention. As discussed in Ahrens, conventional power regulating systems for spacecraft solar panels use shunt dissipative voltage limiters (see FIGS. 4 and 5 of Ahrens) or boost switching limiters (see FIGS. 6–9). Both use a pulse width modulation scheme to maintain a substantially constant output voltage. While the dissipative limiters dump overvoltage through a switch in series with the array, the boost regulator controls the voltage produced across an inductor connected in series between the solar array and the load. The voltage supplied to the load is the sum of the supply voltage and the inductor voltage. The pulse width modulator, by controlling the voltage boost provided by the inductor, regulates the output voltage. There are trade-offs in the two approaches including the high localized heating associated with the dissipative limiters and the end-of-life power waste associated with the boost limiters. The Ahrens patent is direct toward resolving these conflicting constraints by providing a regulating system in which the solar panel array is divided into a constant current part and a constant voltage part with a boost switching regulator connected to receive power from only the constant current part.

A full shunt boost switching BVL for a solar panel array is disclosed in Ashley U.S. Pat. No. 5,504,418, assigned to the assignee of the present invention. Ashley utilizes a coupled-inductor boost switching dc to dc converter topology to provide full shunt voltage limiting for a spacecraft. Unlike Ahrens, this implementation does not require a tapped solar panel array nor separate diodes and wiring at the limiter, and produces very low levels of conducted and radiated electromagnetic interference. The BVL includes a pulse width modulator which controls the duty cycle of a single power switch from 0% to 100% to maintain a substantially regulated bus voltage and provide a variable load current that responds to changes in payload demand. A coupled inductor type boost DC to DC converter includes a pair of main windings which cooperate with the duty cycle modulated power switch to provide the regulated bus voltage. An auxiliary winding of the coupled inductor provides input ripple current cancellation in conjunction with a second inductor and a dc blocking capacitor to reduce electromagnetic interference.

Ashley's full shunt BVL does not have current sense capability. A conventional current sense circuit would provide a transformer having one winding in series with the power switch to sense the current from the solar array. The sensed current produces a unidirectional voltage across a second winding. A rectifier rectifies the unidirectional voltage and produces a current sense signal. In order to accurately sense the solar array current, the coupled inductor's ferrite core must be reset between each cycle. Otherwise the core will become saturated which creates an offset in the current sense signal that causes the BVL to be in shunting mode all the time. At nominal duty cycles, the ferrite core has enough time to reset. However, as the duty cycle approaches 100%, as it does when the load current drops to zero, the core does not have enough time to reset and will eventually saturate from which it cannot recover.

As a result, Ashley uses voltage-mode control to control the pulse width modulator. This is known to be inferior to current-mode control disclosed in Ridley, "A New, Continuous-Time Model For Current-Mode Control," IEEE Transactions on Power Electronics, Vol. 6, No. 2. April, 1991, pp. 271–280, which uses both the sensed regulated bus voltage and the sensed switch or inductor current to control the pulse width modulator. Secondly, Ashley cannot employ current limiting circuitry to protect the BVL from conducting too much current and burning up. Thus, each BVL must be connected to a discrete portion of the solar array such that the supplied current is less than the BVL's limiting threshold. The disadvantage of this configuration is that the transitions in the payload current as the BVLs turn on and off to meet demand are not smooth.

A High Speed PWM Controller that employs current limiting is disclosed in UNITRODE INTEGRATED CIRCUITS, *Product and Applications Handbook*, 1995. However, Unitrode's PWM controller is not a full shunt PWM, i.e. its maximum duty cycle is less than 100%, typically 75%. For this reason, Unitrode can sense the current and employ current limiting.

SUMMARY OF THE INVENTION

In view of the above problems, the present invention provides a full shunt BVL with current sense capability for controlling the application of power from a source to a payload.

This is accomplished with a coupled power inductor having primary and secondary power windings and a current transformer having first and second sensor windings that are connected with opposite polarity, and having a third sensor winding. First and second complementary switches alternately switch with duty cycles D and 1-D, respectively, to deliver current from a power source through the primary winding to a bus that distributes the current to a payload. The output voltage of the power source is varied to maintain output power to the payload load substantially equal to input power from the power source.

The first complementary switch comprises a pair of active switches that are connected in series with the first and second sensor windings, respectively, to alternately deliver current from the power source through the first and second sensor windings with a duty cycle D/2 and through the primary power winding with an effective duty cycle D to the payload. The alternating conduction of current through the first and second sensor windings produces a bidirectional voltage across the third sensor winding that automatically resets the current transformer during each cycle.

A rectifier converts the bidirectional voltage to a unidirectional signal that is a function of the current from the power source. A control circuit such as a current-mode control circuit and/or a current limiter adjusts the duty cycle D/2 of the active switches in response to the unidirectional signal to regulate the bus voltage and supply the demanded load current.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 2a have a timing diagram for the BVL shown in FIG. 1;

FIG. 3 is a plot of the sensed bidirectional voltage for the full shunting condition.

DETAILED DESCRIPTION OF THE INVENTION

The present invention provides current sense capability by replacing the single power switch in Ashley with a pair of parallel connected switches that switch with the same duty cycle D/2 but 180 degrees out of phase. A current transformer is provided with first and second windings connected in series with the pair of switches, respectively, and a third sensing winding. The alternating conduction of current through the first and second windings produces a bidirectional voltage across the third sensor winding that automatically resets the current transformer's ferrite core during each cycle. As a result, the bidirectional voltage can be rectified to produce a current sense signal. The current sense signal is used to provide current-mode control for the PWM, which produces two pulses with duty cycle D/2, 180 degrees out of phase, to alternately turn on and off the two parallel switches. The current sense signal is also used to provide current limiting, which allows multiple BVLs to be connected to the same solar array. This smooths the transitions in the load current supplied to the bus.

Figure 1:
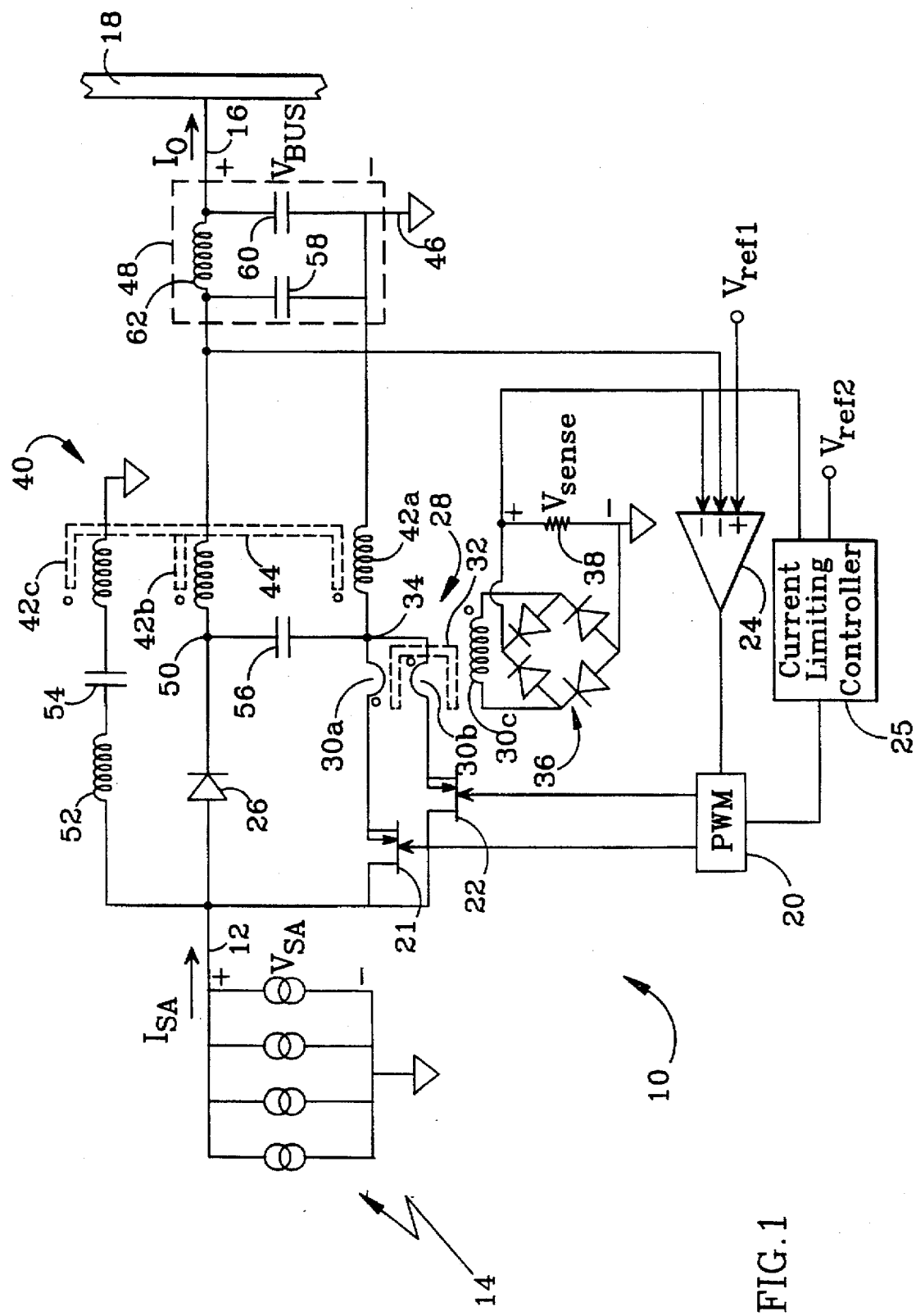
FIG. 1 is a schematic diagram of a full shunt BVL with current sense capability in accordance with the invention.

Referring now to FIG. 1 of the drawings, a schematic diagram of the present invention is shown. A BVL 10 has an input power terminal 12 connected to a photovoltaic solar panel array 14 and an output power terminal 16 connected to a bus 18. The BVL 10 regulates the bus voltage ($V_{bus}$) to a fixed dc voltage ($V_{ref}$) and supplies a variable load current $I_0$ to the bus while balancing the input power of the solar array to the output power plus conversion loss.

The array 14 includes a plurality of individual solar cell circuits. While only four cells are shown, the array may include many more cells connected in a series/parallel configuration to supply the desired current. Each of the cell circuits are bussed together at the panel and wired to the input of the BV1 10, thereby simplifying solar panel assembly and test as well as reducing cost as compared with the conventional sequential shunt limiter.

The BVL 10 includes a pulse width modulator 20 which controls the duty cycles (D/2) of two parallel connected switches 21 and 22 from 0% to 50% for an effective duty cycle D that ranges from 0% to 100% in response to the output of a current-mode error amplifier 24 and a current limiting controller 25. The switches 21 and 22 are preferably power MOSFET devices. A complementary switch 26, preferably a passive diode, is connected in parallel with the parallel combination of switches 21 and 22 and switches in opposition to them with a duty cycle of 1-D.

A current transformer 28 includes windings 30a, 30b, and 30c wound around a ferrite core 32. The windings 30a and 30b are connected in series with switches 21 and 22, respectively, with opposite polarity and terminating at an intermediate terminal 34. Windings 30a and 30b are preferably 1-turn windings to minimize power dissipation. Windings 30a and 30b alternately conduct current from the solar array with duty cycle D/2, which produces a bidirectional voltage across winding 30c that automatically resets the ferrite core 32 during each cycle.

Winding 30c is connected across a rectifier bridge 36 that converts the bidirectional voltage to a unidirectional voltage and applies it across a sense resistor 38. This produces a sense voltage $V_{sense}$ that is proportional to the current supplied by the solar array, and which is input to the current-mode error amplifier 24 and the current limiting controller 25.

A coupled power inductor 40 includes windings 42b, and 42c wound around a ferrite core 44. One side of the winding 42a is connected to a shunt terminal normally the return of the solar array and bus, while the other side is connected to the intermediate terminal One side of the winding 42b is connected to a low pass filter (LPF) 48, the other side of which is connected to the output power terminal 16 while the other side is connected to the complementary switch 26 at intermediate terminal The windings 42a and 42b are the main coupled inductor power windings. The auxiliary winding 42c is used to cancel input ripple current and is connected in series with an inductor 52 and a dc blocking capacitor 54 between the input power terminal 12 and ground. A power transfer capacitor 56 is connected between the intermediate terminals 34 and 50.

The LPF 48 comprises a pair of capacitors 58 and 60 that are connected across the primary (30a) and secondary (30b) windings, and an inductor 62 that is connected between the primary winding and the output power terminal 16. Capacitor 58 provides a first stage LPF and capacitor 60 and inductor 62 together provide a second stage LPF. Furthermore, the inductor 62 presents a high impedance to the primary winding relative to the secondary winding, which helps to reduce ripple on the load current $I_0$.

The current-mode error amplifier 24 senses the bus voltage $V_{bus}$ at one inverting input, senses $V_{sense}$ at a second inverting input, and is connected to the zener diode 19 that provides the reference voltage $V_{ref}$. The error voltage output by the amplifier 24 represents the error between the $V_{ref}$ and the sum of $V_{bus}$ and $V_{sense}$. The amplifier provides the error voltage to the PWM 20, which produces two pulses with duty cycle D/2, 180 degrees out of phase, to alternately turn on and off the two parallel switches 21 and 22. The PWM 20 varies the duty cycle D/2 from 0 to 50% in response to the error voltage such that the effective duty cycle of both switches is D, which varies from 0 to 100%, to regulate the bus voltage and supplied the load current demanded by the payload.

When either switch 21 or 22 are closed, the input voltage VSA is applied to intermediate terminal 34 and the voltage at intermediate terminal 50 equals $V_{SA}$ plus $V_{bus}$. When both switches 21 and 22 are open and complementary switch 26 is closed, the voltage at intermediate terminal 50 is $V_{SA}$ minus the diode drop of diode 26, or essentially $V_{SA}$. Thus, the voltage at intermediate terminal 50 alternates between $V_{SA}$ and $V_{SA}$ plus $V_{bus}$ depending on the positions of switches 21 and 22 and switch 26. During duty cycle modulation of the switches 21 and 22 the voltage at intermediate terminal 50 is averaged to produce $V_{bus}$. The switching frequency of the switches 21 and 22 is much higher than the resonant frequency of the LPF so the voltage across capacitors 56, 58, and 60 is equal to $V_{bus}$.

The following equations describe the idealized relationships between solar array input and bus voltages and currents as a function of duty cycle and power conversion efficiency:

$$\frac{V_{bus}}{V_{SA}} = \frac{1}{1-D} \quad (1)$$

$$V_{bus}I_0 = \eta(V_{SA}I_{SA}) \quad (2)$$

where D is the effective duty cycle produced by switches 21 and 22 and ranges from 0 to 1, and η is conversion efficiency which has a nominal value of 95%.

The solar array output current $I_{SA}$ is essentially a constant current. Thus, rearrangement of the terms in (1) and (2) yields:

$$D = 1 - \frac{I_0}{\eta I_{SA}} \quad (3)$$

In order to accommodate a load current range that includes zero amperes, the BVL must be capable of operating at a duty cycle of up to 100%. With a duty cycle of 100%, referred to as the "saturated" operating mode, all of the solar array current flows through switches 21 and 22 and the lower winding 42a of the coupled power inductor 40. The solar array 14 is completely shunted and no current reaches the limiter output 16. As output current demand increases from zero, the duty cycle is reduced from 100% to maintain the regulated bus voltage. In this "active" operating mode, the bus voltage is regulated by controlling the duty cycles D/2 of switches 21 and 22 to satisfy the relationships as defined in equations (1) and (3).

In the active operating mode, the third winding 42c on the coupled power inductor provides input ripple current cancellation in conjunction with the inductor 52 and the dc blocking capacitor 54. During active mode, the current created in the inductor 52 is equal and opposite to the AC currents in 42a (when it is energized) and 42b (when it is energized). This cancels the input ripple currents caused by the switch so that $I_{SA}$ is essentially a direct current, thereby producing very low levels of conducted and radiated electromagnetic interference. When the duty cycle reaches 0%, the limiter assumes a "passive" operating mode, wherein switches 21 and 22 remain off and all of the solar array current flows through the diode 28 and the upper winding 42b of the coupled power inductor, and is fed to the bus 18. In general, the input and output relationship is the conventional boost as in equation 1. However, the solar array presents a current limited input. Thus, the function of the PWM 20 is to collapse the solar array voltage depending on the load current demand, so that the duty cycle ratio balances the input power to the output power plus conversion loss.

The capability of sensing the current produced by the solar array also enables current sharing and current limiting protection, which allows multiple BVLs to be connected in parallel to one solar array (shown in FIG. 4) instead of being connected to respective portions of a solar array. The current limiting controller 25 receives as inputs the sensed voltage and a reference voltage $V_{ref2}$ and outputs a control signal to the PWM 20 that effectively limits the duty cycle such that it always exceeds some minimum value. Sometimes a BVL will attempt to sink more than its share of the total current provided by the solar array. When $V_{sense}$ exceeds $V_{ref2}$, the BVL goes into current limiting to reduce its current and protect itself. Specifically, the PWM 20 increaseses the duty cycle which, because the demand for load current has not increased, has the effect of trying to reduce the bus voltage. However, because the bus voltage is regulated, the load current, and hence the portion of the solar array current conducted the BVL, is reduced so that the BVL will not conduct any more current.

FIGS. 2a through 2h form a timing diagram for the BVL shown in FIG. 1 for a duty cycle D of 20%. As shown in FIGS. 2a and 2b, the PWM generates two pulses 66 and 68 having duty cycle D/2=10% that are 180 degrees out of phase, and which when taken together have an effective duty cycle of D=20%. As shown in FIGS. 2c and 2d, switches 21 and 22 conduct currents 70 and 72, respectively, in response to the respective pulses 66 and 68. Otherwise, the switches are off and do not conduct current. As shown in FIG. 2e, the diode current 74 is off when either switch 21 or switch 22 are conducting and conducts when both switches are turned off. FIG. 2f shows that the load current $I_0$ remains substantially constant for a given payload. If the demand for load current changes, the PWM adjusts the duty cycle which in turn raises or lowers the level of $I_0$. As shown in FIG. 2g, the current 76 through the secondary winding 42a has a ripple superimposed on an average value of $I_{SA}-I_0$. The high impedance of the LPF causes the ripple on $I_0$ shown in FIG. 2f to be at least an order of magnitude less than the ripple shown in FIG. 2g. FIG. 2h shows the bidirectional voltage 78 produced across the winding 30c in FIG. 1. The bidirectional voltage 78 is a purely AC voltage signal, and thus is guaranteed to reset the ferrite core 32 shown in FIG. 1 during each cycle.

FIG. 3 is a plot of the bidirectional voltage 78 when the duty cycle D is 100%. Even at the full shunting condition, the ferrite core 32 shown in FIG. 1 is guaranteed to reset during each cycle. This is true because switches 21 and 22 shown in FIG. 1 each switch with a duty cycle of 50%, and because they are connected with opposite polarity, the bidirectional voltage is an AC voltage with a 50% duty cycle. This is more than sufficient to guarantee reset each cycle, and thus avoid core saturation.

Figure 4:
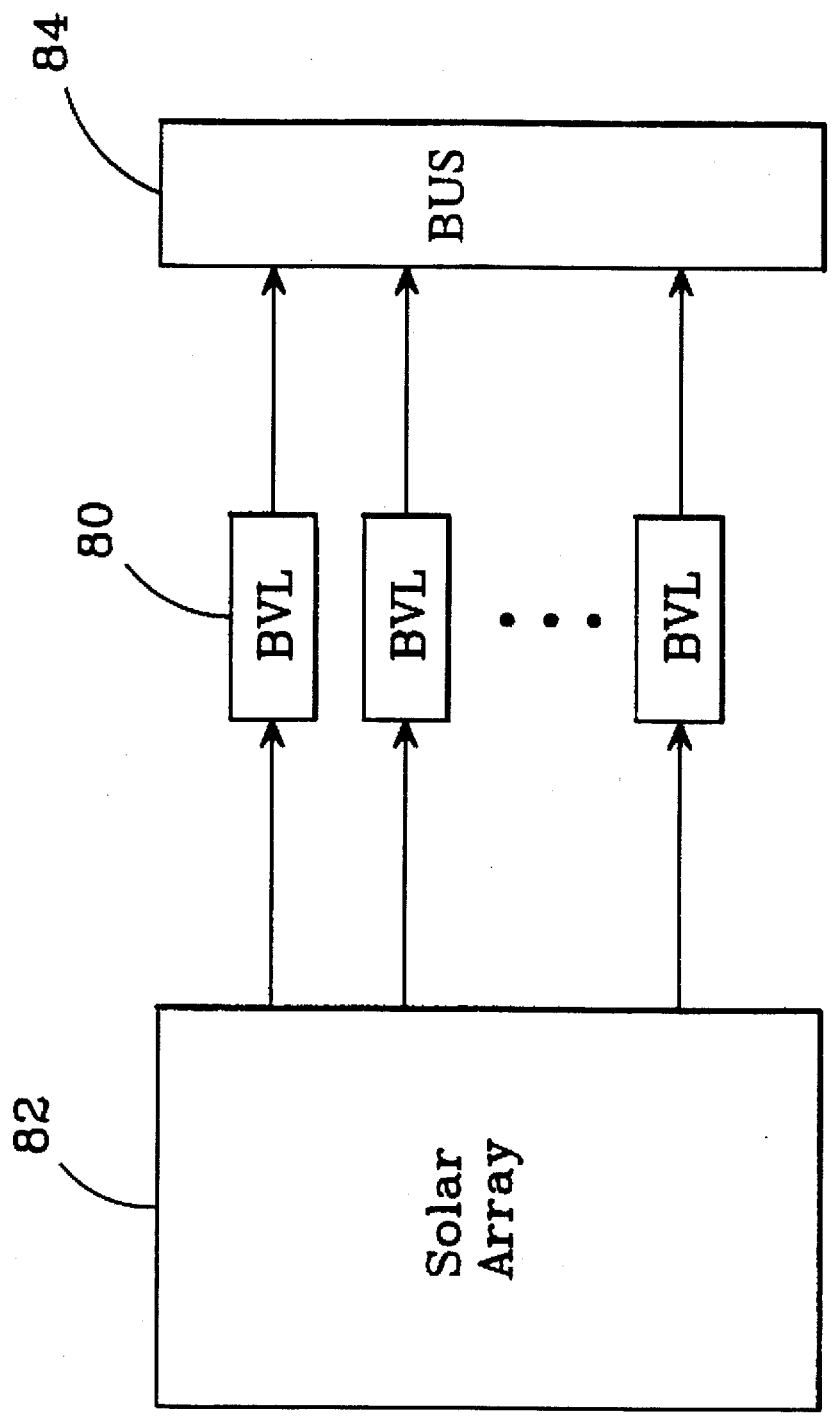
FIG. 4 is a block diagram of a plurality of BVLs of the type shown in FIG. 1 connected between the solar array and the bus.

FIG. 4 is a block diagram of a plurality of BVLs 80 of the type shown in FIG. 1 connected in parallel between a solar array 82 and a bus 84. In this configuration, the solar array produces constant current $I_{SA}$ at a single input terminal. The BVLs turn on and off to supply load current $I_0$ to the bus. Ideally, the amount of supply current used and the amount of load current supplied by each BVL is approximately uniformly distributed across the BVLs. This is more efficient and reduces stress on the individual BVLs. Oftentimes, one or more of the BVLs will try to sink substantially more current than it should. Without the current sense capability provided by the invention, and hence the ability to employ current limiting as described in FIG. 1 and force current sharing, the ferrite cores in the coupled power inductors would saturate, become hot and burn up the switches, which leads to module failure. Thus, the known full shunting BVLs must be connected to discrete portions of the solar array, which by themselves do not produce enough current to saturate and damage the BVLs. The advantage of connecting multiple BVL to one solar array is that the invention eliminates module-to-module transition when the load current varies. This reduces the ripple voltage on the output, which provides a stabler bus.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A full shunt switching bus voltage limiter (BVL) for connection between a power supply and a bus, comprising:

an input terminal for receiving an approximately constant input current $I_{in}$ and a variable input voltage $V_{in}$ from a power supply;

a power transfer stage having a pair of intermediate terminals, a shunt terminal, and an output terminal for connection to a bus that supplies a load current $I_o$ to a variable payload at a regulated bus voltage $V_{bus}$;

a pair of active switches that are connected in parallel between said input terminal and one of said intermediate terminals, said active switches being turned on/off out of phase with each other and with a duty cycle D/2 such that together their effective duty cycle is D;

a complementary switch that is connected between said input terminal and the other intermediate terminal, said complementary switch being turned on/off complementary to the pair of active switches with a duty cycle of 1-D, said active and complementary switches switching to alternately conduct $I_{in}$ such that a shunt current $I_{sh}$ is shunted to the shunt terminal and the load current $I_o$ is directed to the output terminal, said switching causing said power transfer stage to charge and discharge so that the load current $I_o$ is held approximately constant for a given payload;

a sensor core;

a sensor winding that is wound around said sensor core;

a pair of windings that are wound around said sensor core and connected with opposite polarity in series with the respective active switches, the alternating conduction of $I_{in}$ through the pair of windings producing a bidirectional voltage across the sensor winding that automatically resets the sensor core during each cycle;

a rectifier that converts the bidirectional voltage to a unidirectional signal that is a function of the input current; and a control circuit that adjusts the duty cycle D/2 of the active switches in response to the unidirectional signal.

2. The BVL of claim 1, wherein said control circuit comprises:

a current mode control circuit that adjusts the duty cycle D/2 of the active switches in response to the regulated bus voltage and the unidirectional signal to both maintain the regulated bus voltage and to control the level of the load current in response to changes in payload.

3. The BVL of claim 1, wherein when the load current falls to zero, said current mode control circuit adjusts the duty cycle D/2 to substantially 50% such that the effective duty cycle D is substantially 100%.

4. The BVL of claim 1, wherein said control circuit comprises:

a current limiting circuit that senses when the unidirectional signal exceeds a threshold and increase the duty cycle to prevent the load current from going beyond a current limit.

5. The BVL of claim of 1, further comprising:

a solar array that supplies the input current $I_{in}$ and the input voltage $V_{in}$, said input voltage responding to changes in the load current to maintain a power balance in which:

$$\eta I_{in} V_{in} = I_o V_{bus}$$

where $\eta$ is a conversion efficiency for the BVL.

6. The BVL of claim 1, wherein said complementary switch is a diode.

7. The BVL of claim 1, wherein the pair of windings that are wound around said sensor core are 1-turn windings.

8. The BVL of claim 1, wherein the power transfer stage comprises:

a power core;

primary and secondary windings that are wound around said power core and connected between different ones of the intermediate terminals and the output and shunt terminals, respectively;

a low pass filter that is connected between the primary winding and the output terminal for reducing ripple in the load current; and a power transfer capacitor that is connected between the intermediate terminals, said active and complementary switches switching to alternately conduct $I_{in}$ such that when said passive switch is on the shunt current $I_{sh}$ is shunted through the power transfer capacitor and the secondary winding to the shunt terminal and the load current $I_o$ is directed through the primary winding to the output terminal and when one of the active switches is on the shunt current is shunted through the secondary winding to the shunt terminal and the load current is directed through the power transfer capacitor and the primary winding to the output terminal, said switching causing said power transfer capacitor to charge and discharge so that the load current $I_o$ is held approximately constant at (1-D) $xI_{in}$ for a given payload.

9. A bus voltage limiter (BVL), comprising:

an input terminal;

a solar array for supplying a substantially constant input current $I_{in}$ and a variable input voltage $V_{in}$ at the input terminal;

a power core;

primary and secondary windings that are wound around said power core, said windings having input and output ends;

a power transfer capacitor that is connected between the input ends of the primary and secondary windings;

an output terminal that is coupled to the output end of the primary winding for connection to a bus that supplies a load current $I_o$ to a variable payload at a regulated bus voltage $V_{bus}$;

a low pass filter connected between the primary winding and the output terminal that presents a high impedance to the primary winding to reduce ripple in the load current;

a shunt terminal that is connected to the output end of the secondary winding;

a pair of active switches that are connected in parallel between said input terminal and the secondary winding's input end, said active switches being turned on/off substantially 180 degrees out of phase with each other and with a duty cycle D/2 such that together their effective duty cycle is D;

a complementary switch that is connected between said input terminal and the input end of the primary winding, said complementary switch being turned on/off complementary to the pair of active switches with a duty cycle of 1-D, said active and complementary switches switching to alternately conduct $I_{in}$ such that when said passive switch is on a shunt current $I_{sh}$ is shunted through the power transfer capacitor and the secondary winding to the shunt terminal and the load current $I_o$ is directed through the primary winding to the output terminal and when one of the active switches is on the shunt current is shunted through the secondary winding to the shunt terminal and the load current is directed through the power transfer capacitor and the primary winding to the output terminal, said switching causing said power transfer capacitor to charge and discharge so that the load current $I_o$ is held approximately constant at $(1-D)xI_{in}$ for a given payload;

a sensor core;

a sensor winding that is wound around said sensor core;

a pair of windings that are wound around said sensor core and connected with opposite polarity in series with the respective active switches, the alternating conduction of $I_{in}$ through the pair of windings producing a bidirectional voltage across the sensor winding that automatically resets the sensor core during each cycle;

a rectifier that converts the bidirectional voltage to a unidirectional signal that is a function of the input current; and a current mode control circuit that adjusts the effective duty cycle D over a range that includes 100% to both maintain the regulated bus voltage and to control the level of the load current over a range that includes zero current in response to changes in payload.

10. The BVL of claim 9, wherein said BVL further comprises:

a current limiting circuit that senses when the unidirectional signal exceeds a threshold and increases the duty cycle to prevent the load current from exceeding a current limit.

11. The BVL of claim 9, wherein said complementary switch is a diode.

12. The BVL of claim 9, wherein the pair of windings that are wound around said sensor core are 1-turn windings.

13. A bus voltage limiting system, comprising:

a bus for supplying current to a variable payload;

an input terminal;

a solar array for supplying a substantially constant solar array current $I_{SA}$ and a variable solar array voltage $V_{SA}$ at the input terminal; and a plurality of bus voltage limiters (BVLs) that are connected in parallel between the input terminal and the bus for supplying a load current $I_0$ to the variable payload at a regulated bus voltage $V_{bus}$, each BVL comprising:

a power transfer stage having a pair of intermediate terminals, a shunt terminal, and an output terminal for connection to the bus to supply a portion $I_{BVL}$ of the load current $I_o$;

a pair of active switches that are connected in parallel between said input terminal and one of said intermediate terminals, said active switches being turned on/off out of phase with each other and with a duty cycle D/2 such that together their effective duty cycle is D;

a complementary switch that is connected between said input terminal and the other intermediate terminal, said complementary switch being turned on/off complementary to the pair of active switches with a duty cycle of 1-D, said active and complementary switches switching to alternately conduct an input current $I_{in}$ such that a shunt current $I_{sh}$ is shunted to the shunt terminal and the portion $I_{BVL}$ is directed to the output terminal, said switching causing said power transfer stage to charge and discharge so that the portion $I_{BVL}$ is held approximately constant for a given payload;

a sensor core;

a sensor winding that is wound around said sensor core;

a pair of windings that are wound around said sensor core and connected with opposite polarity in series with the respective active switches, the alternating conduction of $I_{in}$ through the pair of windings producing a bidirectional voltage across the sensor winding that automatically resets the sensor core during each cycle;

a rectifier that converts the bidirectional voltage to a unidirectional signal that is a function of the input current; and a current limiting circuit that senses when the unidirectional signal exceeds a threshold and increases the duty cycle to prevent $I_{BVL}$ from supplying too large a portion of the load current $I_0$.

14. The BVL of claim 13, wherein said control circuit comprises:

a current mode control circuit that adjusts the duty cycle of the active switches in response to the regulated bus voltage and the unidirectional signal to both maintain the regulated bus voltage and to control the level of the load current in response to changes in payload.

15. The BVL of claim 14, wherein said current mode control circuits together respond to changes in the load current to maintain a power balance in which:

$$\eta I_{SA} V_{SA} = I_o V_{bus}$$

where $\eta$ is a conversion efficiency for the BVL.

16. The BVL of claim 13, wherein when the load current falls to zero, said current mode control circuit adjusts the duty cycle D/2 to substantially 50% such that the effective duty cycle D is substantially 100%.

17. The BVL of claim 13, wherein said current limiting circuits together distribute the load current $I_0$ among the BVLs to force current sharing.

18. The BVL of claim 13, wherein the power transfer stage comprises:

a power core;

primary and secondary windings that are wound around said power core and connected between different ones of the intermediate terminals and the output and shunt terminals, respectively;

a low pass filter that is connected between the primary winding and the output terminal for reducing ripple in the load current; and a power transfer capacitor that is connected between the intermediate terminals, said active and complementary switches switching to alternately conduct $I_{in}$ such that when said passive switch is on the shunt current $I_{sh}$ is shunted through the power transfer capacitor and the secondary winding to the shunt terminal and the portion $I_{BVL}$ is directed through the primary winding to the output terminal and when one of the active switches is on the shunt current is shunted through the secondary winding to the shunt terminal and the load current is directed through the power transfer capacitor and the primary winding to the output terminal, said switching causing said power transfer capacitor to charge and discharge so that the portion $I_{BVL}$ is held approximately constant at $(1-D) \times I_{in}$ for a given payload.

19. A bus voltage limiter (BVL) connected between a power source that provides substantially constant current and a variable output voltage, and a load, said BVL connected said power source to said load and comprising:

a coupled power inductor having first and second power windings;

a current transformer having first and second sensor windings that are connected in parallel with opposite polarity, and having a third sensor winding;

first and second complementary switches that alternately switch with duty cycles D and 1-D, respectively, to deliver current from said power source through said second winding to said load, whereby the output voltage of said power source is varied to maintain output power to said load substantially equal to input power from said power source, said first complementary switch, comprising:

a pair of active switches that are connected in series with said first and second sensor windings, respectively, to alternately deliver current from said power source through said first and second sensor windings with a duty cycle D/2 and through the second power winding with an effective duty cycle D to the load, said alternating conduction of current through the first and second sensor windings producing a bidirectional voltage across the third sensor winding that automatically resets the current transformer during each cycle, a rectifier that converts the bidirectional voltage to a unidirectional signal that is a function of the current from the power source; and a control circuit that adjusts the duty cycle D/2 of the active switches in response to the unidirectional signal.

20. The BVL of claim 19, wherein said control circuit comprises:

a current mode control circuit that adjusts the duty cycle D/2 of the active switches in response to a load voltage and the unidirectional signal to regulate the load voltage and to control the amount of current supplied to the load in response to changes in the load.

21. The BVL of claim 19, wherein when the load current falls to zero, said current mode control circuit adjusts the duty cycle D/2 to substantially 50% such that the effective duty cycle D is substantially 100%.

22. The BVL of claim 19, wherein said control circuit comprises:

a current limiting circuit that senses when the unidirectional signal exceeds a threshold and increasces the duty cycle to prevent the load current from exceeding a current limit.

* * * * *